B. BORLAND.
SEAT.
APPLICATION FILED JUNE 6, 1912.
1,156,834.
Patented Oct. 12, 1915.
2 SHEETS—SHEET 1.
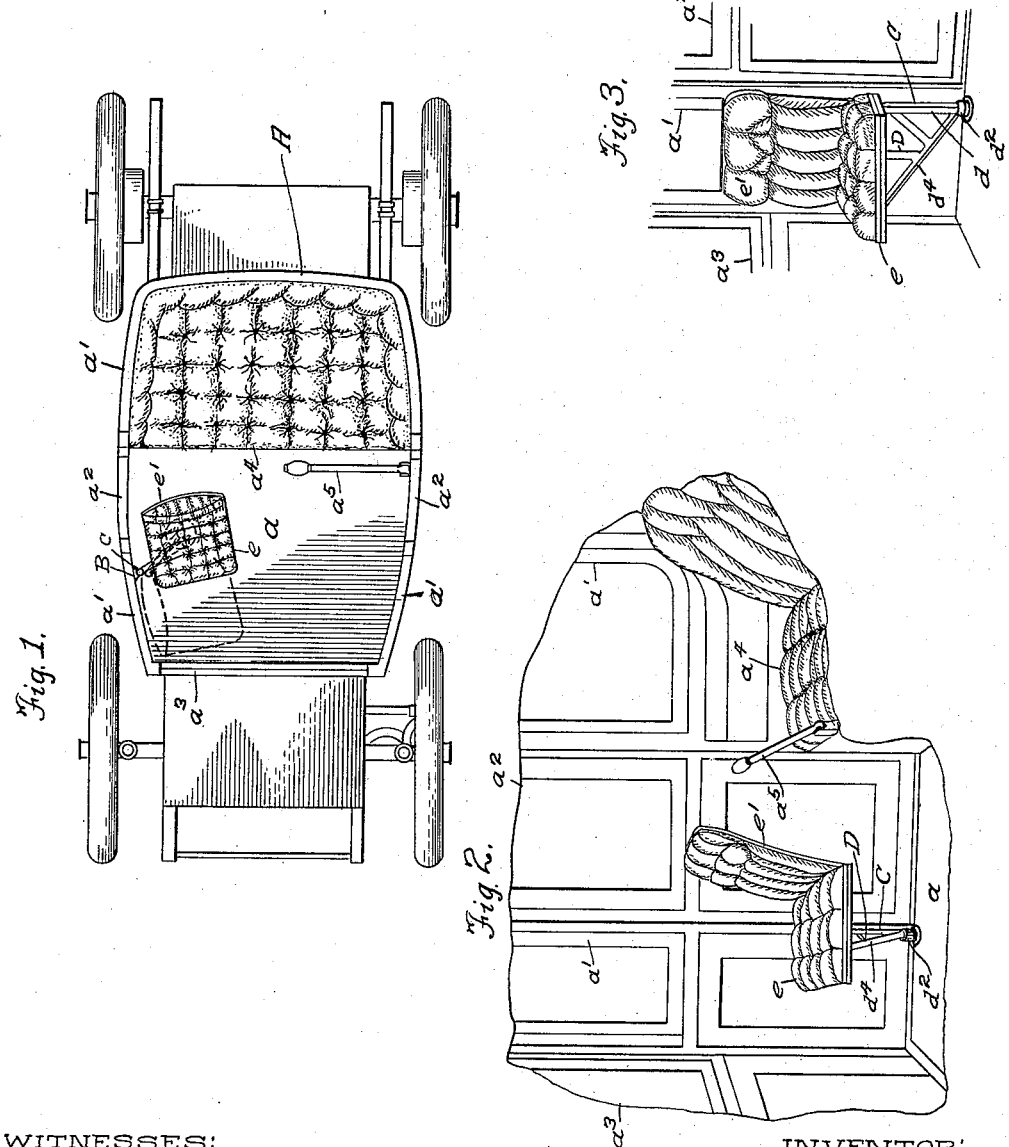
WITNESSES:
L. B. Graham
Edith Wilson
INVENTOR:
Bruce Borland
By J. Mc Roberts
his Atty.

B. BORLAND.
SEAT.
APPLICATION FILED JUNE 6, 1912.
1,156,834.
Patented Oct. 12, 1915.
2 SHEETS—SHEET 2.
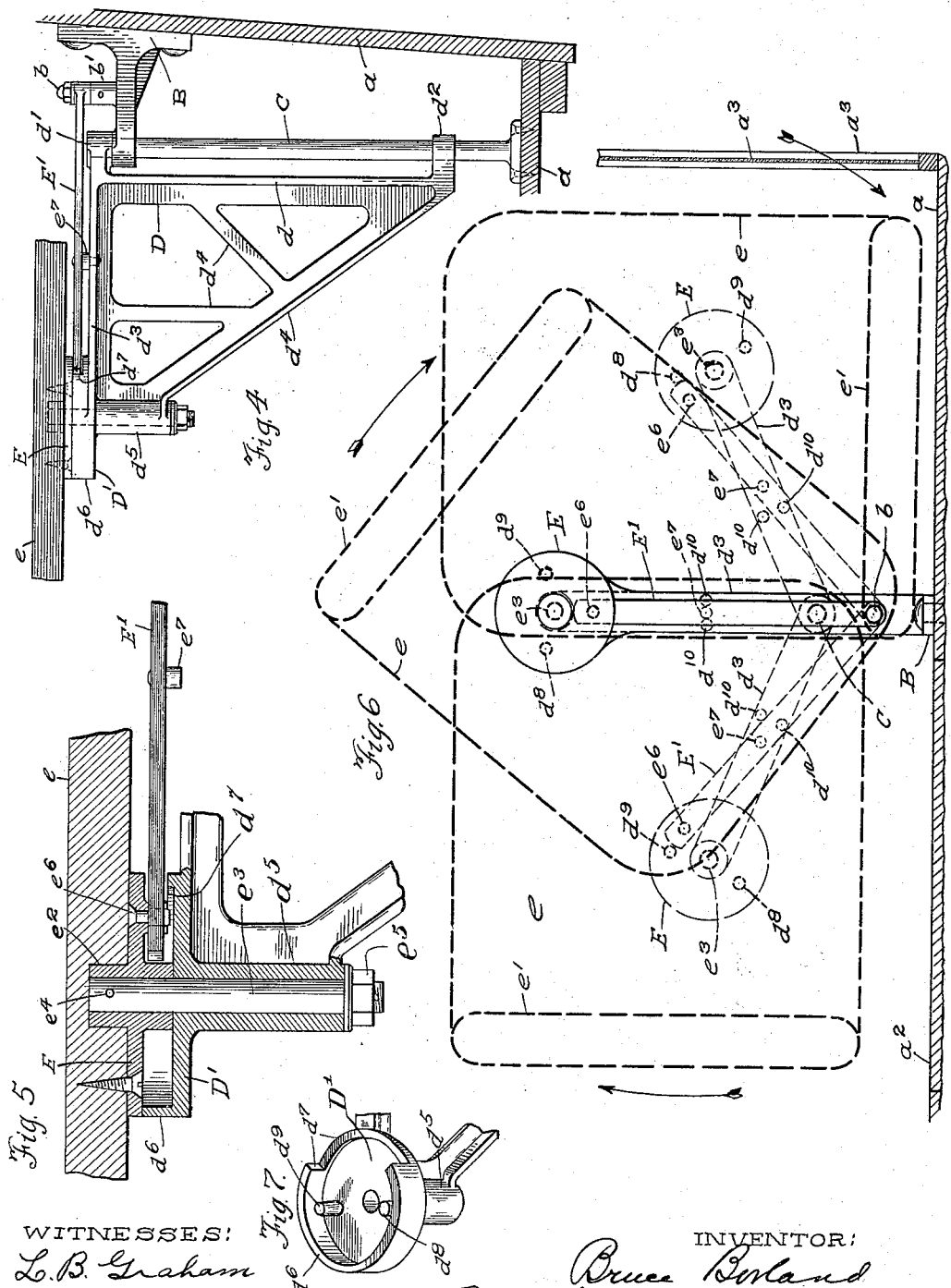
WITNESSES:
L. B. Graham
Edith Niles
INVENTOR:
Bruce Borland
By J. M. Roberts
his Atty.

UNITED STATES PATENT OFFICE.

BRUCE BORLAND, OF CHICAGO, ILLINOIS, ASSIGNOR TO THE BORLAND-GRANNIS COMPANY, OF CHICAGO, ILLINOIS, A CORPORATION OF NEW JERSEY.

SEAT.

1,156,834.  Specification of Letters Patent.  Patented Oct. 12, 1915.

Application filed June 6, 1912. Serial No. 701,946.

*To all whom it may concern:*

Be it known that I, BRUCE BORLAND, a citizen of the United States, residing at Chicago, in the county of Cook and State of Illinois, have invented certain new and useful Improvements in Seats, of which the following is a specification, reference being had therein to the accompanying drawing.

My invention relates to revolving seats and is especially intended to provide a new and useful seat for vehicles which will occupy a position when in use to enable its occupant to face forward in the direction of the movement of the vehicle and may be swung around out of the line of the vehicle door where it may be used for a person sitting sidewise in the vehicle.

The invention consists in the matters hereinafter disclosed and then pointed out in the appended claims.

In the accompanying drawings which illustrate a practical embodiment of my invention—Figure 1 is a top plan view of an automobile provided with a seat embodying my invention, the top of the body of the car being omitted for purposes of clearer illustration of the seat which is shown in full lines in position to enable its occupant to face forward and in dotted lines in position out of the line of the vehicle door; Fig. 2 is a detail view of the interior of the vehicle with the seat in position for use; Fig. 3 is a view similar to Fig. 2 with the seat in position out of the line of the door; Fig. 4 is a detail side view of the seat structure with the supporting parts of the vehicle in section; Fig. 5 is a detail sectional view of the outer end of the seat-bracket and associated parts; Fig. 6 is a view showing the seat in top plan in three positions with the supporting parts of the vehicle in section; and Fig. 7 is a detail view of the seat-supporting disk or plate.

While the seat is shown in the accompanying drawings in position in the interior of an automobile body it is to be understood that it may be used in other forms of vehicles or in any location where it may be desired.

In the embodiment shown the reference letter A represents a suitable vehicle body, such for example as an electric automobile, provided with the usual running gear and having the usual bottom $a$, sides $a'$, side doors $a^2$, front glass panel $a^3$, fixed seat $a^4$, and steering lever $a^5$.

One side of the body is provided in front of its door with a supporting bracket B projecting inwardly and forming a bearing for one end of a supporting post C which rests at its other end on the floor to which it is suitably secured. The post forms the supporting upright for a swinging bracket D which may be of any suitable form adapted to swing at one end upon the post as its pivot and to support the seat at its free end; in the embodiment shown the bracket is composed of a vertical arm $d$ having upper and lower end collars $d'$, $d^2$ encircling the supporting post, and a lateral horizontal arm $d^3$ with suitable intermediate braces $d^4$, the upper collar $d'$ being stepped upon the post or resting upon the upper face of the lateral bracket B, all these parts having their bearing faces finished to allow the collar to turn freely on the bracket. The outer end of the swinging bracket is provided with an annular disk or plate D' preferably integral therewith and having a downwardly projecting central sleeve $d^5$ and an upwardly projecting peripheral flange $d^6$ which is cut away or provided with a gate as at $d^7$ at the side toward the supporting post C.

A seat base E carrying a seat $e$ with a suitable back $e'$ is provided in the form of a plate adapted to rest and turn upon the flange $d^6$ of the disk D', and having a central sleeve $e^2$ in which a downwardly projecting spindle $e^3$ is suitably pinned or otherwise secured as at $e^4$, the lower end of the sleeve resting upon the disk D' and the lower portion of the spindle passing through the sleeve $d^5$ and provided at its end with a retaining washer and nut $e^5$, whereby the seat is secured in place on the disk against accidental displacement but is free to turn thereon. The base E is provided on its lower face adjacent the cut-away portion of the flange with a pin $e^6$ to which one end of a link E' is pivoted, the other end of the link being pivoted to a pin $b$ fixed on the bracket B and held by means of an intermediate ring or washer $b'$ at sufficient elevation above the bracket to clear the collar $d'$ when the parts are swung. The pivot $b$ of the link is in the rear of the post C, and the outer end of the link E' passes freely into the passage or gate afforded by the cut-away portion $d^7$ of the flange $d^6$ of the disk D' but does not reach to the sleeve $e^2$, and the link and horizontal arm $d^3$ of the bracket D extend laterally in parallel horizontal planes with the link above the arm and in vertical alinement with it when the parts are intermediate their limits of swinging motion but crossing it when the parts are at either limit of their movement as clearly shown in Fig. 6. The disk D' is provided with an opposite pair of stop-pins $d^8$ and $d^9$ located in a line slightly outside of or beyond its central line and extending into the path of the outer end of the link E' so as to alternately abut against the same when the parts are swung to their predetermined opposite limits of movement and stop the swinging movement of the parts on the post as shown in Fig. 6. The link E' is provided with a downwardly projecting central lug $e^7$ at a point slightly beyond its center, and the horizontal arm $d^3$ of the swinging bracket D is provided with a pair of upwardly projecting lugs $d^{10}$ spaced apart sufficiently to allow the lug $e^7$ to pass between them, the relation of these opposing lugs being such that they stand in line when the parts are in the central position shown in Fig. 6, the function of the lugs $d^{10}$ being to then bear against the lug $e^7$ as the arm $d^3$ swings to either side of this central position and so pivot the link E' at its dead center out of alinement with the bracket arm to cause its outer end to cross the arm.

When the seat is in the position shown in Fig. 2 and in full lines in Fig. 1, the parts occupy the relative positions shown at the left side of Fig. 6 with the pin $d^9$ abutting against the end of the link E' on the right hand side of the bracket arm $d^3$ and so holding the seat against further movement to the left or toward the side $a$ of the vehicle, the bracket then extending outwardly and rearwardly from the post and with the seat in position to allow its occupant to face forward or in the direction of movement of the vehicle and standing in position in the line of the door. When the seat is to be swung to the position shown in Fig. 3 out of the line of the door to facilitate the entrance or exit of the occupants of the vehicle, the bracket D is swung around forwardly toward the front of the vehicle in the direction of the arrows shown in Fig. 6, and as the link E' is pivoted off or eccentric to the axial line of the supporting post on which the seat swings it draws the pin $e^6$ around to the position shown at the central position of the parts in Fig. 6 and so rotates the seat on the disk D'; when the parts reach this central position the lug $e^7$ alines between the lugs $d^{10}$, and the continued swinging of the bracket toward its position at the right hand of Fig. 6 causes the left hand lug $d^{10}$ to crowd or cam the lug $e^7$ to move the link across the central line of the bracket arm $d^3$ so that the outer end of the link will cross to the left hand side of the bracket arm, and the continued swinging of the seat in the direction of the arrows will cause the link to further rotate the seat on the disk D' until the opposite pin $d^8$ abuts against the outer end of the link and holds the parts against further movement toward the side of the vehicle, the back $e'$ of the seat then being in alinement with the side of the vehicle as shown at the right hand in Fig. 6 and the seat being positioned as shown in Fig. 3 to uncover the door and still be in a position where it can be used for a person sitting facing sidewise. The swinging of the bracket D in opposite direction rotates the seat reversely, the right hand lug $d^{10}$ then camming the lug $e^7$ to move the link across the central line of the bracket arm $d^3$ so that the outer end of the link will cross to the right hand side of arm and abut against the stop $d^9$. The bracket swings forwardly and rearwardly through an arc of less than 180 degrees, while the seat is rotated three-quarters of a turn on the bracket so that its rear edge or back will stand approximately in the line of the width of the vehicle when in position to allow facing forward and parallel with the side of the vehicle when in position to uncover the door and allow sitting sidewise.

By my invention the seat enables its occupant to face forward and with the necessary leg-room between the seat and front portion of the vehicle, while it may be swung around to occupy this leg-space and uncover the door and allow occupant to sit facing sidewise.

I claim:—

1. In a device of the class described, a horizontally swinging arm having a pivotal support, a disk on the free end of the arm, a base having a seat portion and rotatably mounted on the disk, a link pivoted at its outer end on the base and at its other end eccentric to the pivot of the arm, and co-acting means on the link and arm to cause the outer end of the link to cross the arm when the latter is swung on its pivot.

2. In a device of the class described, a bracket, a horizontally swinging arm having a pivotal support on the bracket, a disk on the free end of the arm having a pair of stops, a base having a seat portion and rotatably mounted on the disk, a link pivoted at its outer end on the base in the line of the stops and at its other end on the bracket eccentric to the pivot of the arm, and co-acting means on the link and arm to cause the outer end of the link to cross the arm when the latter is swung on its pivot.

3. In a device of the class described, a bracket, a horizontally swinging arm having a pivotal support near the end of the bracket, a disk on the free end of the arm having opposite stops, a base having a seat portion and rotatably mounted on the disk, a link pivoted at its outer end on the base in the line of the stops and at its other end on the bracket in the rear of the pivot of the arm, and co-acting projections on the link and arm to cause the outer end of the link to cross the arm when the latter is swung on its pivot.

4. In a device of the class described, a horizontally swinging arm having a pivotal support, a disk on the free end of the arm, a base having a seat portion and rotatably mounted on the disk, a link overlying the arm and pivoted at its outer end on the base and at its other end in the rear of the pivot of the arm, a downwardly projecting lug on the link, and a pair of upwardly projecting lugs on the arm spaced apart to allow the lug on the link to pass between them and adapted to pivot the same when the arm is swung on its pivot.

5. In a device of the class described, a horizontally swinging arm having a pivotal support, a disk on the free end of the arm, a base having a seat portion and rotatably mounted on the disk, a link overlying the arm and pivoted at its outer end on the base and at its other end in the rear of the pivot of the arm, stops on the base coöperating with the link, a downwardly projecting lug on the link, and a pair of upwardly projecting lugs on the arm spaced apart to allow the lug on the link to pass between them and adapted to pivot the same when the arm is swung on its pivot.

6. In a device of the class described, a bracket, a horizontally swinging arm having a pivotal support on the bracket, a disk on the free end of the arm having a pair of stops a base having a seat portion and rotatably mounted on the disk, a link overlying the arm and pivoted at its outer end on the base in the line of the stops and at its other end on the bracket in the rear of the pivot of the arm, a downwardly projecting lug on the link, and a pair of upwardly projecting lugs on the arm spaced apart to allow the lug on the link to pass between them and adapted to pivot the same when the arm is swung on its pivot.

7. In a device of the class described, a supporting body having a bracket mounted thereon, an arm mounted on the bracket to swing toward and away from the body, a seat rotatably mounted on the arm, a link crossing the arm and adapted to rotate the seat when the arm is swung on its bracket, projections on the arm and link to pivot the link when the arm is swung, and stops on the seat coöperating with the link to limit the rotation of the seat to three-quarters of a circle.

8. In a device of the class described, a supporting body having a fixed lateral bracket mounted thereon, a horizontal arm mounted on the bracket to swing toward and away from the body, a seat rotatably mounted on the arm, a link crossing the arm and pivoted to the bracket and seat to rotate the seat through an arc of three-quarters of a circle when the arm is swung on its bracket, interacting projections on the arm and link to pivot the link when the arm is swung, and tops to limit the rotation of the seat to three-quarters of a circle.

In testimony whereof I affix my signature in presence of two witnesses.

BRUCE BORLAND.

Witnesses:
J. McROBERTS,
H. C. SUIT.